United States Patent Office 2,717,068
Patented Sept. 6, 1955

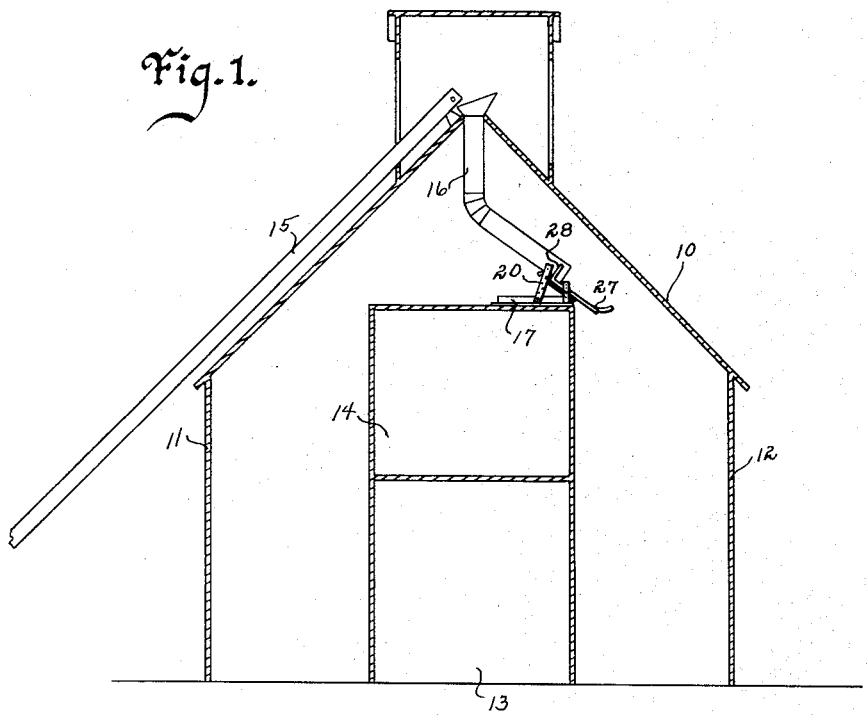
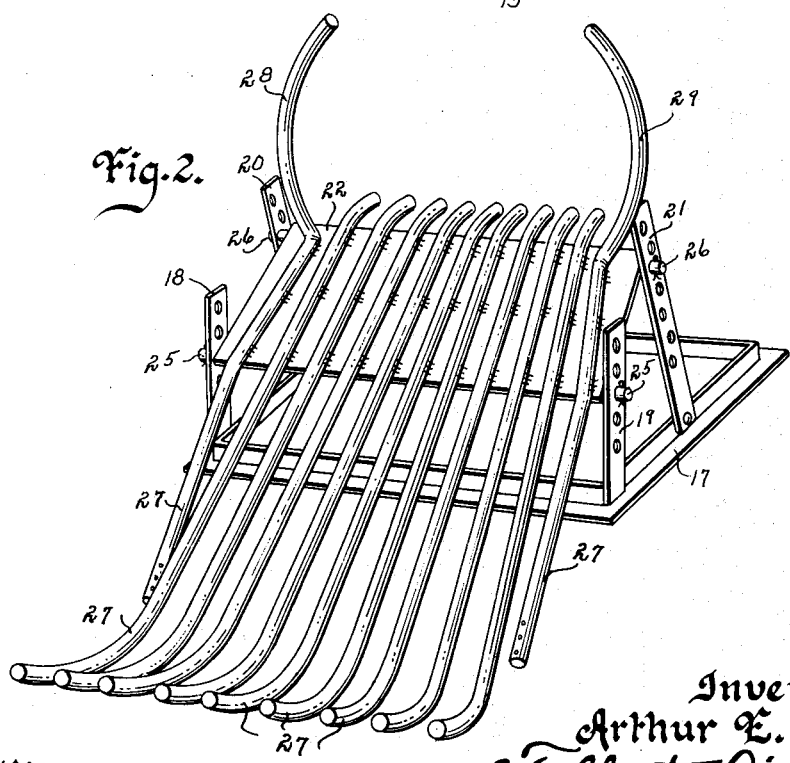

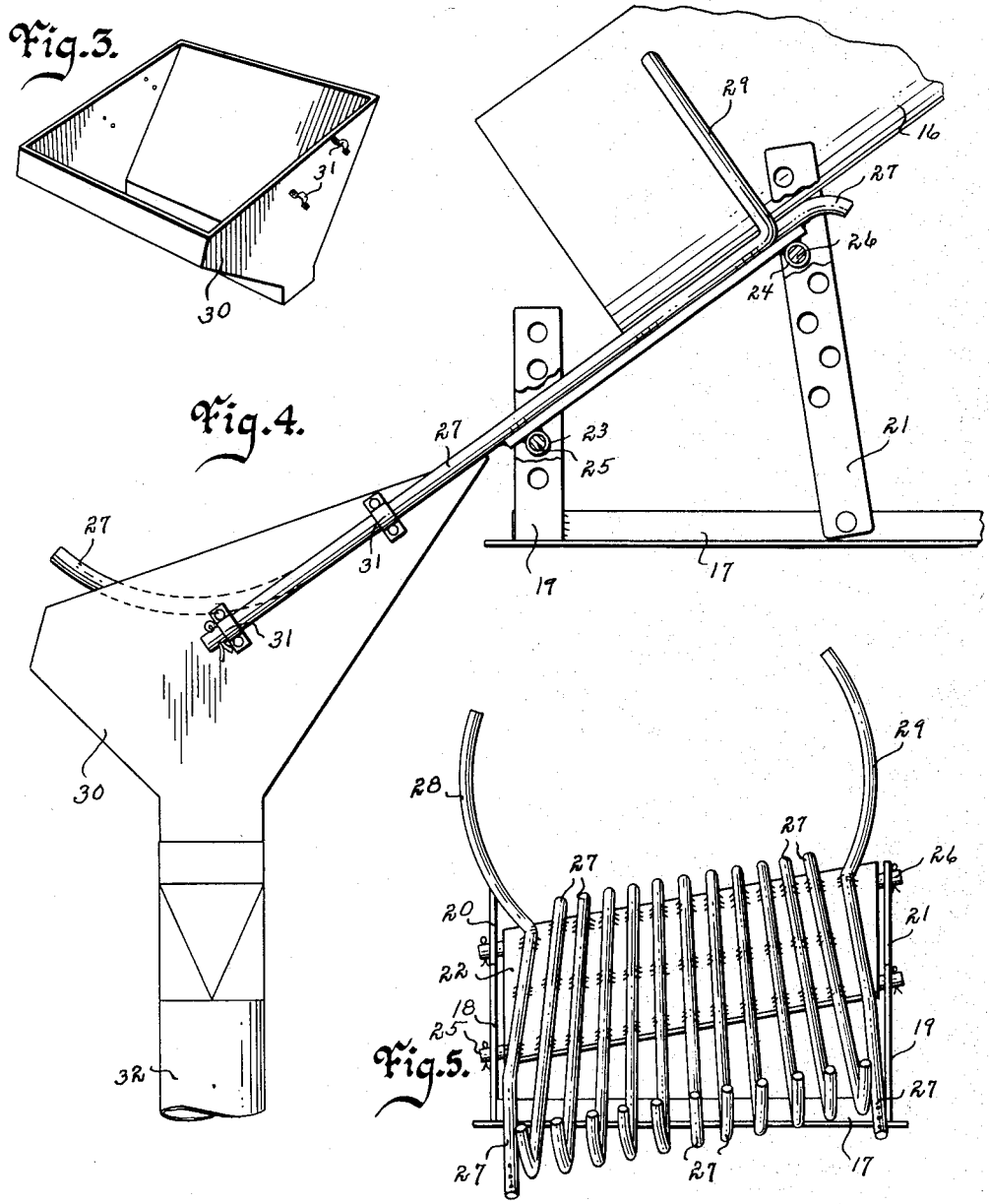

2,717,068

CORN HANDLING MEANS

Arthur E. Paschal, Vinton, Iowa

Application March 2, 1954, Serial No. 413,584

5 Claims. (Cl. 193—2)

This invention relates to corn storage equipment and more particularly to a device for directing, retarding, distributing and possible separating corn at the time it is directed into a storage bin, crib or like.

Most corn after harvesting is placed in a corn crib for storage and drying. These cribs usually have sides that are formed of spaced apart slats to permit ample air passage while retaining the ears of corn. The most common type crip has a solid roof, a longitudinal driveway through it, and often a grain bin above the driveway. The driveway also acts as an airway through the center of the building. To fill each side of the building with ears of corn, the common practice is to elevate the corn by mechanical means to the top of the building and then by use of a chute, direct it to either side over the top of the grainery above the driveway. While this does eventually fill the crib, several objectionable factors occur. First, the corn is dropped and discharged downwardly and laterally with such force that it strikes the inner side of the outside wall. This is most damaging to the wall and necessitates its frequent repair or replacement. Furthermore, considerable corn is shelled from the ears striking the slotted wall of the crib. Obviously at least some of this shelled grain falls through the air spaces in the outer wall and is lost. Secondly, any shelled grain mingled with the ear corn will be deposited in the crib at one location. Such packing of the ears with shelled corn shuts out needed air circulation for drying and the result may well be costly spoilage. Furthermore, by the introduction of the ears at only one point in the crib, they will tend to assume packed parallel positions relative to each other, making their eventual removal from the crib by hand shovel most difficult.

Therefore, the principal object of my invention is to provide an ear corn distributing means that will slow down the speed of travel of the speed of travel of the corn at moment of discharge into a crib or like.

A still further object of my invention is to provide an ear corn handling means for cribs or like that is capable of directing the corn into various points within the crib or like.

A still further object of this invention is to provide a means for adjustably controlling the speed of travel of the corn being discharged into a storage space.

A still further object of my invention is to provide a corn discharge unit that greatly reduces the amount of shelled corn herebefore experienced in the process of filling a crib with ear corn.

A still further object of this invention is to provide a corn control unit that will, if desired, separate the shelled corn from the ear corn at time of discharge of the same into a storage housing.

Still further objects of my invention are to provide a corn discharge control unit that is economical in manufacture and durable in use.

These and other objects will be apparent to those skilled in the art.

My invention consists in the construction, arrangement, and combination of the various parts of the device, whereby the objects contemplated are attained as hereinafter more fully set forth, specifically pointed out in my claims, and illustrated in the accompanying drawings, in which:

Fig. 1 is an end sectional view of a corn crib with my device in use therewith,

Fig. 2 is an enlarged perspective view of my device, and more fully illustrates its construction, Fig. 3 is a perspective view of a grain receiving hopper that may be used when desired, Fig. 4 is a side view of my device with the grain hopper attached, and Fig. 5 is a front view of my corn control device tilted for directing corn forwardly and to one side.

In these drawings I have used the numeral 10 to designate an ordinary corn crib having the sides 11 and 12, the drive-through 13, and the grainery 14 above the drive-through. There are several methods of elevating the ear corn to the top of the building. Usually a powered elevator 15 is used, and the pipe chute 16 is employed to direct the corn over and to either side of the grain bin 14. As before noted, without my device the corn shoots out of the chute 16, outwardly and downwardly to strike the inside of the outer wall of the crib. I will now describe my device in detail. The numeral 17 designates a base frame adapted to rest on and if desired secured to the top side of the grain bin 14 as shown in Fig. 1. If desired, one each of my devices may be used for each side of the crib, or if one only is used, this base 17 is moved on top of the grain bin to the proper location. At each side of the forward end of the base frame are the two spaced apart vertical posts 18 and 19. Each of these posts has a series of holes in its length as shown in Fig. 2. Spaced back of the post 18, and hinged at its lower end to the base frame is a post 20. Spaced back of the post 19 and hinged at its lower end to the base frame is a post 21. Both these posts 20 and 21 have a series of spaced apart holes in their lengths. The numeral 22 designates a flat rectangular sheet member. On the bottom front edge portion of the member 22 is a pipe or tube 23. The numeral 24 designates a parallel similar member on the bottom rear edge portion of the flat sheet member. The width of the flat sheet member is comparable to the distance between the posts 18 and 19, and between the posts 20 and 21, inasmuch as it is between these posts that the flat sheet member functions. To attach this flat sheet member between the posts, a rod 25 detachably extends through the tube 23, a selected hole in the post 18 and a selected hole in the post 19. In a similar manner a rod 26 detachably extends through the tube 24, a selected hole in the post 20, and a selected hole in the post 21. Any suitable means may be employed to prevent the accidental withdrawal of the rods 25 and 26, such as cotter-pins extending through the end portions of the rods as shown in Fig. 5. The shield plate flat member 22 extends forwardly and downwardly. The rear posts 20 and 21 are hinged at their lower ends to permit adjustment of the member by selectively extending the rods 25 and 26 through the various holes in the posts. The numeral 27 designates a plurality of spaced apart substantially parallel rod grid bars fixed by welding or like to the top of the plate 22. These rods extend forwardly of the flat plate member 22, and all except the two outer side ones, have their forward free ends curved forwardly and upwardly as shown in Fig. 2. Thus, with the flat plate 22 extending forwardly and downwardly, these rods will extend also forwardly and downwardly but with their free ends curved upwardly. These grid bars are so spaced apart that an ear of corn cannot fall between them. To promote even flow of the corn, I have these rod bars slightly spreading apart as they progress forwardly. The rear ends of all but the two outside ones extend to the rear of the plate 22 and are bent therefrom slightly downwardly as shown in Fig. 4. The two outside bar rods 27 have their rear end portions bent to extend upwardly and curved inwardly toward each other to provide brace horns 28 and 29 for engagement with the outlet end of the pipe chute 16 as shown in Fig. 4. The forward end portions of these two outside bars 27 progress straight and parallel with each other to receive and support the auxiliary shelled grain hopper 30, when such a hopper is desired. The hopper has loops 31 at each side for detachably receiving the end portions of these two outside bars. A cotter-key may be used through the ends of these two supporting bars to hold the hopper in place thereon. When such a hopper is used, the rod bars act as a separator, directing the ear corn past the hopper and permitting the shelled corn to fall into the hopper. A conduit 32 leading from the bottom of the hopper will deliver the shelled kernels to a desired locality. In some instances, it will be in the grain bin 14.

The practical operation of my device is as follows: The ears of corn will be deposited on the upper rear end of the rod grid unit at an angle thereto. The ears must slide forwardly thereon and their speed of travel will be progressively retarded. As the ears reach the forward end portion of the bars, their direction of travel will be changed to an upwardly and forwardly one, thereby reducing their speed to a minimum. Thus the ears will have lost their momentum and will fall directly downwardly and short of the wall of the crib. The bars will also spread or fan the ears to each side providing a maximum width stream. Very little undesirable shelling will occur in the process. By selectively placing the frame base, at various locations, the corn may be placed at any location. Damp or dry ear corn will have different sliding properties on the bars, and, therefore, various angles of tilt of the bars may be desirable for proper control. This can be accomplished by placing the rod 26 in higher or lower holes in the posts 20 and 21. Also the rod 25 may be lowered or raised. For lateral directional control the rods 25 and 26 may be lowered or raised in holes in the posts 19 and 21, or the holes in the posts 18 and 20 as shown in Fig. 5. If the hopper is detached and not used, the shelled grain will be spread evenly with the ears, and thereby eliminating a condensation of the grain into a given area. By the ears being so controlled, they are random deposited in the crib, and, therefore, easily scooped from the crib when it is desired to remove them.

Some changes may be made in the construction and arrangement of my corn handling means without departing from the real spirit and purpose of my invention, and it is my intention to cover by my claims, any modified forms of structure or use of mechanical equivalents which may be reasonably included within their scope.

I claim:

1. In a device of the class described, a base frame, two spaced apart forward posts on said base frame each having a series of vertically arranged holes, two spaced apart rear posts hinged to said base frame each having a series of vertically arranged holes, a rod selectively extending through holes in said first two posts, a rod selectively extending through the holes of said two second posts, a plate secured to said two rods, and a plurality of spaced apart grate rods on said plate.

2. In a device of the class described, a base frame, two spaced apart forward posts on said base frame each having a series of vertically arranged holes, two spaced apart rear posts hinged to said base frame each having a series of vertically arranged holes, a rod selectively extending through holes in said first two posts, a rod selectively extending through the holes of said two second posts, a plate secured to said two rods, and a plurality of spaced apart grate rods on said plate spreading slightly apart as they extend forwardly.

3. In a device of the class described, a base frame, two spaced apart forward posts on said base frame each having a series of vertically arranged holes, two spaced apart rear posts hinged to said base frame each having a series of vertically arranged holes, a rod selectively extending through holes in said first two posts, a rod selectively extending through the holes of said two second posts, a plate secured to said two rods, and a plurality of spaced apart grate rods on said plate spreading slightly apart as they extend forwardly and each having their outer end portion curved upwardly.

4. In a device of the class described, a base frame, two spaced apart forward posts on said base frame each having a series of vertically arranged holes, two spaced apart rear posts hinged to said base frame each having a series of vertically arranged holes, a rod selectively extending through holes in said first two posts, a rod selectively extending through the holes of said two second posts, and a plurality of spaced apart grate rods operatively secured to said two rods.

5. In a device of the class described, a base frame, two supporting rods on said base frame, at least one of which is vertically adjustable thereon, a plate secured to said two rods, and a plurality of spaced apart grate rods on said plate.

References Cited in the file of this patent

UNITED STATES PATENTS

| | | |
|---|---|---|
| 741,398 | Gmelin | Oct. 13, 1903 |
| 1,798,711 | States | Mar. 31, 1931 |
| 1,908,722 | Yeakel | May 16, 1933 |
| 2,445,950 | Jennings et al. | July 27, 1948 |